United States Patent
Fu et al.

(10) Patent No.: US 6,633,945 B1
(45) Date of Patent: Oct. 14, 2003

(54) FULLY CONNECTED CACHE COHERENT MULTIPROCESSING SYSTEMS

(75) Inventors: Daniel Fu, Sunnyvale, CA (US); Carlton T. Amdahl, Alameda County, CA (US); Walstein Bennett Smith, III, Palo Alto, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/349,641

(22) Filed: Jul. 8, 1999

Related U.S. Application Data

(63) Continuation-in-part of application No. 09/281,749, filed on Mar. 30, 1999, now Pat. No. 6,516,442, which is a continuation-in-part of application No. 09/163,294, filed on Sep. 29, 1998, now Pat. No. 6,292,705, which is a continuation-in-part of application No. 08/986,430, filed on Dec. 7, 1997, now Pat. No. 6,065,077.

(51) Int. Cl.[7] .............................................. G06F 13/00
(52) U.S. Cl. ..................... 710/316; 710/317; 710/29; 709/213; 711/130
(58) Field of Search ................................ 710/100, 305, 710/313, 315, 316, 317, 29; 711/144, 143, 130, 147; 709/213

(56) References Cited

U.S. PATENT DOCUMENTS

| | | |
|---|---|---|
| 4,315,308 A | 2/1982 | Jackson |
| 4,438,494 A | 3/1984 | Budde et al. |
| 4,480,307 A | 10/1984 | Budde et al. |
| 5,161,156 A | 11/1992 | Baum et al. |
| 5,271,000 A | 12/1993 | Engbersen et al. |
| 5,313,609 A | 5/1994 | Baylor et al. |
| 5,335,335 A | 8/1994 | Jackson et al. |
| 5,440,698 A | 8/1995 | Sindhu et al. |
| 5,505,686 A | 4/1996 | Willis et al. |
| 5,511,226 A | 4/1996 | Zilka |
| 5,513,335 A | 4/1996 | McClure |
| 5,524,234 A | 6/1996 | Martinez, Jr. et al. |
| 5,526,380 A | 6/1996 | Izzard |
| 5,535,363 A | 7/1996 | Prince |
| 5,537,569 A | 7/1996 | Masubuchi |
| 5,537,575 A | 7/1996 | Foley |
| 5,553,310 A | 9/1996 | Taylor et al. |
| 5,561,779 A | 10/1996 | Jackson |
| 5,568,620 A | 10/1996 | Sarangdhar et al. |
| 5,574,868 A | 11/1996 | Marisetty |
| 5,577,204 A | 11/1996 | Brewer et al. |
| 5,581,729 A | 12/1996 | Nishtala et al. |
| 5,588,131 A | 12/1996 | Borrill |
| 5,594,886 A | 1/1997 | Smith et al. |
| 5,602,814 A | 2/1997 | Jaquette et al. |
| 5,606,686 A | 2/1997 | Tarui et al. |
| 5,634,043 A | 5/1997 | Self et al. |
| 5,634,068 A | 5/1997 | Nishtala et al. |
| 5,644,754 A | 7/1997 | Weber |
| 5,655,100 A | 8/1997 | Ebrahim et al. |
| 5,657,472 A | 8/1997 | Van Loo et al. |

(List continued on next page.)

OTHER PUBLICATIONS

Technical White Paper, Sun TM Enterprise TM 10000 Server, Sun Microsystems, Sep. 1998.

Alan Charlesworth, Starfire: Extending the SMP Envelope, IEEE Micro, Jan./Feb. 1998, pp. 39–49.

(List continued on next page.)

*Primary Examiner*—Sumati Lefkowitz
*Assistant Examiner*—X. Chung-Trans
(74) *Attorney, Agent, or Firm*—Keith Kind; Kelly H. Hale

(57) ABSTRACT

Fully connected multiple FCU-based architectures reduce requirements for Tag SRAM size and memory read latencies. A preferred embodiment of a symmetric multiprocessor system includes a switched fabric (switch matrix) for data transfers that provides multiple concurrent buses that enable greatly increased bandwidth between processors and shared memory. A high-speed point-to-point Channel couples command initiators and memory with the switch matrix and with I/O subsystems.

10 Claims, 15 Drawing Sheets

U.S. PATENT DOCUMENTS

| | | | |
|---|---|---|---|
| 5,682,516 | A | 10/1997 | Sarangdhar et al. |
| 5,684,977 | A | 11/1997 | Van Loo et al. |
| 5,696,910 | A | 12/1997 | Pawlowski |
| 5,796,605 | A | 8/1998 | Hagersten |
| 5,829,034 | A | 10/1998 | Hagersten et al. |
| 5,895,495 | A | 4/1999 | Arimilli et al. |
| 5,897,656 | A | 4/1999 | Vogt et al. |
| 5,940,856 | A | 8/1999 | Arimilli et al. |
| 5,946,709 | A | 8/1999 | Arimilli et al. |
| 5,978,411 | A | 11/1999 | Kitade et al. |
| 6,044,122 | A | 3/2000 | Ellersick et al. |
| 6,065,077 | A * | 5/2000 | Fu .............................. 710/100 |
| 6,125,429 | A * | 9/2000 | Goodwin et al. ........... 711/143 |
| 6,145,007 | A | 11/2000 | Dokic et al. |
| 6,279,084 | B1 | 8/2001 | VanDoren et al. |
| 6,289,420 | B1 * | 9/2001 | Cypher ....................... 711/144 |
| 6,292,705 | B1 | 9/2001 | Wang et al. |
| 6,295,581 | B1 * | 9/2001 | DeRoo ....................... 711/135 |

OTHER PUBLICATIONS

Joseph Heinrich, Origin TM and Onyz2 TM Theory of Operations Manual, Document No. 007–3439–002, Silicon Graphics, Inc., 1997.

White Paper, Sequent's NUMA–Q SMP Architecture, Sequent, 1997.

White Paper, Eight–way Multiprocessing, Hewlett–Packard, Nov. 1997.

George White & Pete Vogt, Profusion, a Buffered, Cache-Coherent Crossbar Switch, presented at Hot Interconnects Symposium V, Aug. 1997.

Alan Charlesworth, et al., Gigaplane—XP: Extending the Ultra Enterprise Family, presented at Hot Interconnects Symposium V, Aug. 1997.

James Loudon & Daniel Lenoski, The SGI Origin: A ccNUMA Highly Scalable Server, Silicon Graphics, Inc., presented at the Proc. Of the $24^{th}$ Int'l Symp. Computer Architecture, Jun. 1997.

Mike Galles, Spider: A High–Speed Network Interconnect, IEEE Micro, Jan./Feb. 1997, pp. 34–39.

T.D. Lovett, R. M. Clapp and R. J. Safranek, Numa–Q: an SCI–based Enterprise Server, Sequent, 1996.

Daniel E. Lenoski & Wolf–Dietrich Weber, Scalable Shared-Memory Multiprocessing, Morgan Kaufmann Publishers, 1995, pp. 143–159.

David B. Gustavson, The Scalable coherent Interface and Related Standards Projects, (as reprinted in Advanced Multimicroprocessor Bus Architectures, Janusz Zalewski, IEEE computer Society Press, 1995, pp. 195–207.).

Kevin Normoyle, et al., UltraSPARC TM Port Architecture, Sun Microsystems, Inc., presented at Hot Interconnects III, Aug. 1995.

Kevin Normoyle, et al., UltraSPARC TM Port Architecture, Sun Microsystems, Inc., presented at Hot Interconnects III, Aug. 1995, UltraSparc Interfaces.

Kai Hwang, Advanced Computer Architecture: Parallelism, Scalability, Programmability, McGraw–Hill, 1993, pp. 355–357.

Jim Handy, The Cache Memory Book, Academic Press, 1993, pp. 161–169.

Angel L. Decegama, Parallel Processing Architectures and VLSI Hardware, vol. 1, Prentice–Hall, 1989, pp. 341–344.

* cited by examiner

FULLY CONNECTED CACHE COHERENT MULTIPROCESSING SYSTEMS

CROSS-REFERENCE TO RELATED APPLICATIONS

This patent application is a continuation-in-part of the following commonly-owned, U.S. patent application Ser. Nos.: U.S. application Ser. No. 08/986,430 now U.S. Pat. No. 6,065,077, AN APPARATUS AND METHOD FOR A CACHE COHERENT SHARED MEMORY MULTIPROCESSING SYSTEM filed Dec. 7, 1997; U.S. application Ser. No. 09/163,294 now U.S. Pat. No. 6,292,705, METHOD AND APPARATUS FOR ADDRESS TRANSFERS, SYSTEM SERIALIZATION, AND CENTRALIZED CACHE AND TRANSACTION CONTROL, IN A SYMMETRIC MULTIPROCESSOR SYSTEM, filed Sep. 29, 1998; and U.S. application Ser. No. 09/281,749 now U.S. Pat. No 6,516,442, CACHE INTERFACE AND PROTOCOLS FOR CACHE COHERENCY IN A SCALABLE SYMMETRIC MULTIPROCESSOR SYSTEM, filed Mar. 30, 1999; all of which are incorporated by reference herein.

BACKGROUND

FIGS. 2–11 show point to point cache coherent switch solution for multiprocessor systems that are the subject of copending and coassigned applications.

Depending on the implementation specifics, these designs may be problematic in two respects:

1. Tag SRAM size is expensive
2. Latency is greater than desired

First, SRAM Size Issue:

To support L2 size=4 MB, total 64 GB memory and 64 byte line size the TAG array entry will be 4 MB/64 Byte=64K entries the TAG size will be 14 bits The total TAG array size=14 bits *64K=917,504 bit/per CPU To support 8-way system, a duplicated TAG array size will be 8*14 bits *64K—about 8M bit SRAM.

8 Mbit SRAM is too large for single silicon integrait even with 0.25 micron CMOS process.

Second, Latency Issue:

Although the switch fabric solutions of FIGS. 2–11 provide scalability in memory throughput, maximum transaction parallelism, and easy PCB broad routing, the latency for memory read transactions is greater than desired.

Example for Memory Read Transactions:

CPU read transaction will first latched by CCU, CCU format transaction into channel command, CCU will send the transaction through channel, FCU's IIF unit will de-serialize the channel command or data and perform cache coherency operation, then FCU will send the memory read transaction to MCU. MCU will de-serialize the channel command, send the read command to DRAM address bus, MCU read from DRAM data bus, send the data to FCU via channel, FCU will send data to CCU via channel. Finally the data is presented at CPU bus. A transaction for read crosses the channel four times. Each crossing introduces additional latency. What is needed is an SMP architecture with the benefits of the present FCU architecture, but with reduced Tag SRAM size requirements per chip and with reduced latencies.

SUMMARY

Fully connected multiple FCU-based architectures reduce requirements for Tag SRAM size and memory read latencies. A preferred embodiment of a symmetric multiprocessor system includes a switched fabric (switch matrix) for data transfers that provides multiple concurrent buses that enable greatly increased bandwidth between processors and shared memory. A high-speed point-to-point Channel couples command initiators and memory with the switch matrix and with I/O subsystems.

BRIEF DESCRIPTION OF DRAWINGS

FIG. 7a illustrates a minimal configuration, 7b illustrates a 4-way configuration, 7c illustrates an 8-way high-performance configuration, and 7d illustrates a configuration for I/O intensive applications.

DETAILED DESCRIPTION

System Overview

Figure 1:
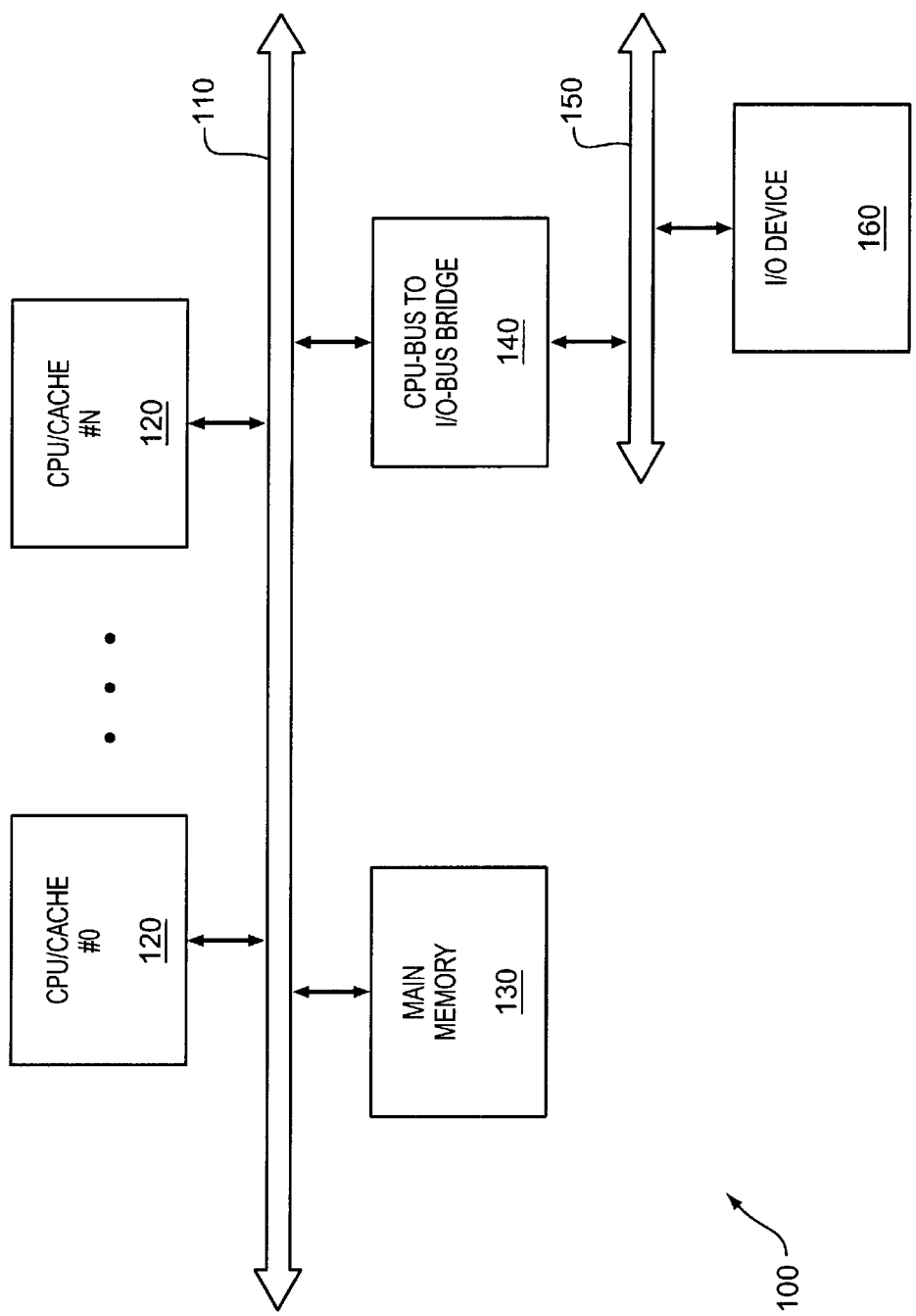
FIG. 1 is a drawing of a prior-art generic symmetric shared-memory multiprocessor system using a shared-bus.
Figure 2:
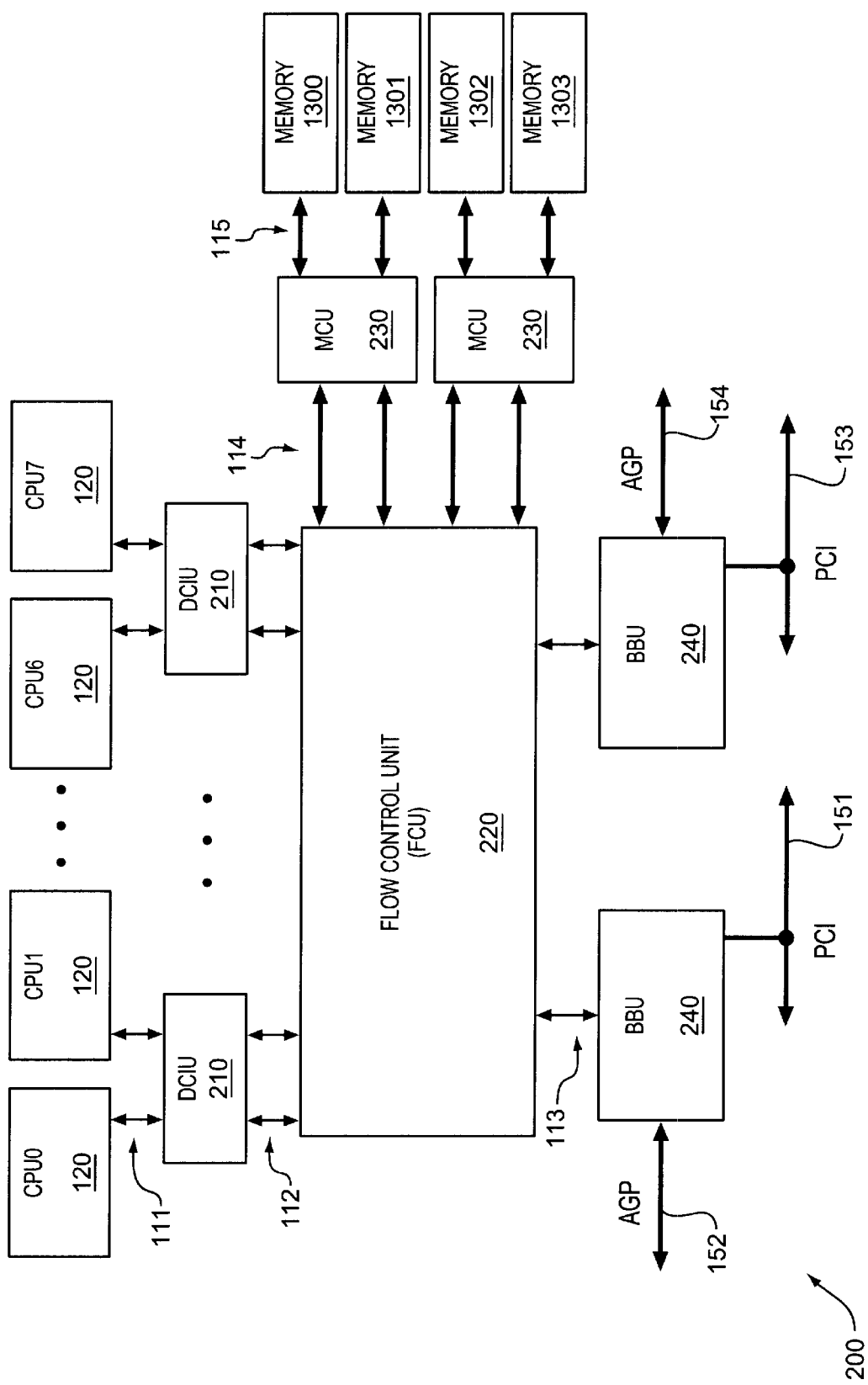
FIG. 2 is a drawing of a preferred embodiment symmetric shared-memory multiprocessor system using a switched fabric data path architecture centered on a Flow-Control Unit (FCU).

FIG. 2 is a drawing of a preferred embodiment symmetric shared-memory multiprocessor system using a switched fabric data path architecture centered on a Flow-Control Unit (FCU) 220. In the illustrated embodiment, eight processors 120 are used and the configuration is referred herein as an "8P" system.

The FCU (Flow Control Unit) 220 chip is the central core of the 8P system. The FCU internally implements a switched-fabric data path architecture. Point-to-Point (PP)

interconnect 112, 113, and 114 and an associated protocol define dedicated communication channels for all FCU I/O. The terms Channels and PP-Channel are references to the FCU's PP I/O. The FCU provides Point-to-Point Channel interfaces to up to ten Bus Bridge Units (BBUs) 240 and/or CPU Channel Units (CCUs, also known as Chanel Interface Units or CIUs) and one to four Memory Control Units (MCUs) 230. Two of the ten Channels are fixed to connect to BBUs. The other eight Channels can connect to either BBUs or CCUs. In an illustrative embodiment the number of CCUs is eight. In one embodiment the CCUs are packaged as a pair referred herein as a Dual CPU Interface Unit (DCIU) 210. In the 8P system shown, the Dual CPU Interface Unit (DCIU) 210 interfaces two CPUs with the FCU. Throughout this description, a reference to a "CCU" is understood to describe the logical operation of each half of a DCIU 210 and a references to "CCUs" is understood to apply to equally to an implementation that uses either single CCUs or DCIUs 210. CCUs act as a protocol converter between the CPU bus protocol and the PP-Channel protocol.

Figure 5:
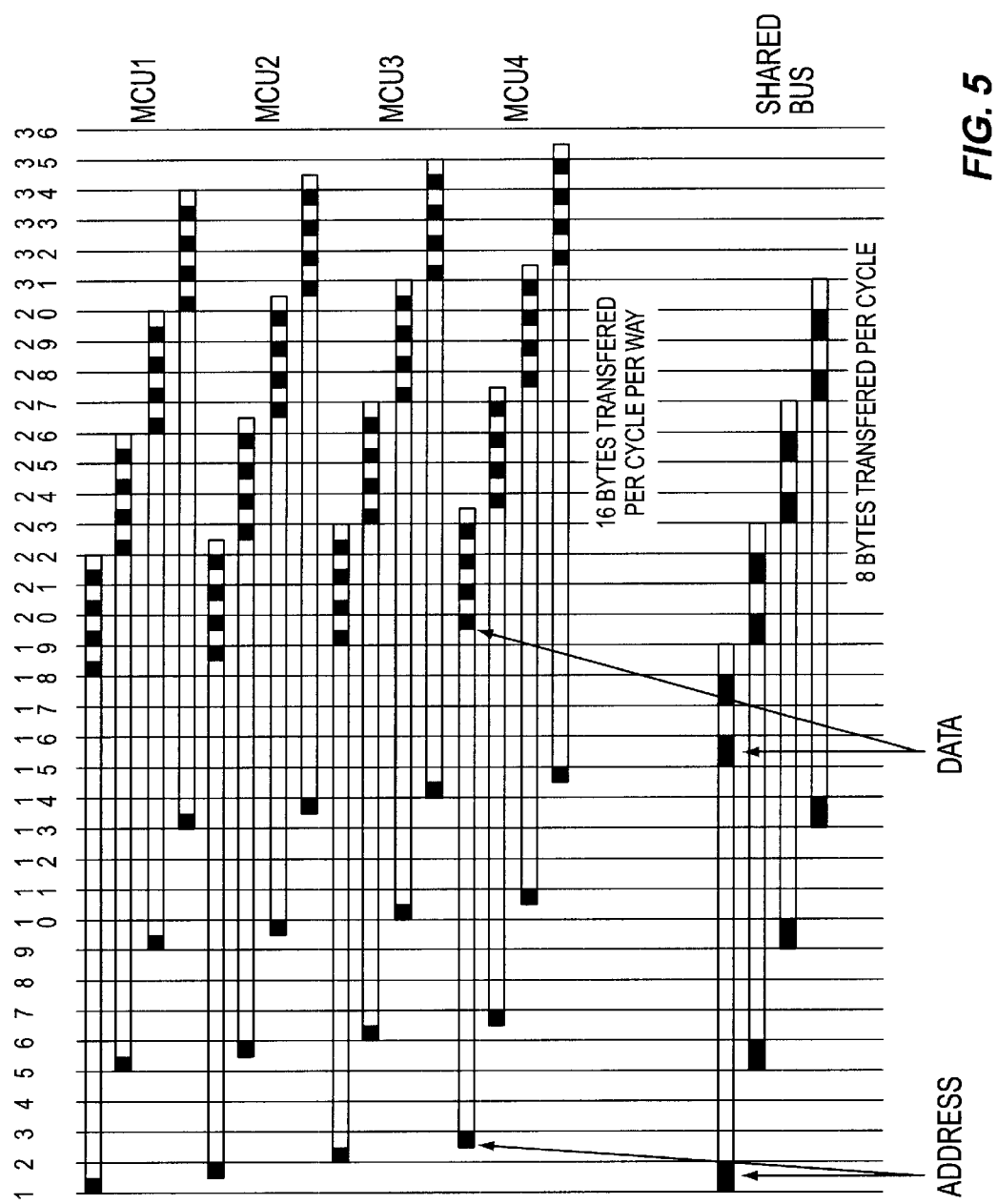
FIG. 5 is a timing diagram comparing the memory transaction performance of a system based on a flow control unit according to the present invention and a prior art shared-bus system.

The FCU 210 provides a high-bandwidth and low-latency connection among these components via a Data Switch, also referred herein as a Simultaneous Switched Matrix (SSM), or switched fabric data path. In addition to connecting all of these components, the FCU provides the cache coherency support for the connected BBUs and CCUs via a Transaction Controller and a set of cache-tags duplicating those of the attached CPUs' L2 caches. FIG. 5 is a timing diagram comparing the memory transaction performance of a system based on a flow control unit according to the present invention and a prior art shared-bus system.

In a preferred embodiment, the FCU provides support two dedicated BBU channels, four dedicated MCU channels, up to eight additional CCU or BBU channels, and PCI peer-to-peer bridging. The FCU contains a Transaction Controller (TC) with reflected L2, states. The TC supports up to 200M cache-coherent transactions/second, MOSEI and MESI protocols, and up to 39-bit addressing. The FCU contains the Simultaneous Switch Matrix (SSM) Dataflow Switch, which supports non-blocking data transfers.

In a preferred embodiment, the MCU supports flexible memory configurations, including one or two channels per MCU, up to 4 Gbytes per MCU (maximum of 16 Gbytes per system), with one or two memory banks per MCU, with one to four DIMMS per bank, of SDRAM, DDR-SDRAM, or RDRAM, and with non-interleaved or interleaved operation.

In a preferred embodiment, the BBU supports both 32 and 64 bit PCd bus configurations, including 32 bit/33 MHz, 32 bit/66 MHz, and 64 bit/66 MHz. The BBU is also 5V tolerant and supports AGP.

All connections between components occur as a series of "transactions." A transaction is a Channel Protocol request command and a corresponding Channel Protocol reply. For example, a processor, via a CCU, can perform a Read request that will be forwarded, via the FCU, to the MCU; the MCU will return a Read reply, via the FCU, back to the same processor. A Transaction Protocol Table (TPT) defines the system-wide behavior of every type of transaction and a Point-to-Point Channel Protocol defines the command format for transactions.

The FCU assumes that initiators have converted addresses from other formats to conform with the PP-Channel definitions. The FCU does do target detection. Specifically, the FCU determines the correspondence between addresses and specific targets via address mapping tables. Note that this mapping hardware (contained in the CFGIF and the TC) maps from Channel Protocol addresses to targets. The mapping generally does not change or permute addresses.

Summary of Key Components

Transaction Controller (TC) 400. The most critical coherency principle obeyed by the FCU is the concept of a single, system-serialization point. The system-serialization point is the "funnel" through which all transactions must pass. By guaranteeing that all transactions pass through the system-serialization point, a precise order of transactions can be defined. (And this in turn implies a precise order of tag state changes.) In the FCU, the system-serialization point is the Transaction Controller (TC). Coherency state is maintained by the duplicate set of processor L2 cache-tags stored in the TC.

The Transaction Controller (TC) acts as central system-serialization and cache coherence point, ensuring that all transactions in the system happen in a defined order, obeying defined rules. All requests, cacheable or not, pass through the Transaction Controller. The TC handles the cache coherency protocol using a duplicate set of L2 cache-tags for each CPU. It also controls address mapping inside the FCU, dispatching each transaction request to the appropriate target interface.

Transaction Bus (TB) 3104 and Transaction Status Bus (TSB) 3106. All request commands flow through the Transaction Bus. The Transaction Bus is designed to provide fair arbitration between all transaction sources (initiators) and the TC; it provides an inbound path to the TC, and distributes outbound status from the TC (via a Transaction Status Bus). The Transaction Bus (TB) is the address/control "highway" in the FCU. It includes an arbiter and the Transaction Bus itself. The TB pipelines the address over two cycles. The extent of pipelining is intended to support operation of the FCU at 200 MHz using contemporary fabrication technology at the time of filing of this disclosure.

Whereas the TB provides inputs to the Transaction Controller, the Transaction Status Bus delivers outputs from the Transaction Controller to each interface and/or target. The TSB outputs provide transaction confirmation, coherency state update information, etc. Note that while many signals on the TSB are common, the TC does drive unique status information (such as cache-state) to each interface. The Transaction Bus and Transaction Status Bus are discussed in detail later in this application.

Switched Fabric Data Path (Data Switch). The Data Switch is an implementation of a Simultaneous Switched Matrix (SSM) or switched fabric data path architecture. It provides for parallel routing of transaction data between multiple initiators and multiple targets. The Data Switch is designed to let multiple, simultaneous data transfers take place to/from initiators and from/to targets (destinations of transactions). Note that the Data Switch is packet based. Every transfer over the Data Switch starts with a Channel Protocol command (playing the role of a packet header) and is followed by zero or more data cycles (the packet payload). All reply commands (some with data) Now through the Data Switch. Both write requests and read replies will have data cycles. Other replies also use the Data Switch and will only send a command header (no payload).

IIF (Initiator InterFace) 3102. The IIF is the interface between the FCU and an initiator (a BBU or a CCU). The IIF transfers Channel Protocol commands to and from the initiator. The IIF must understand the cache coherency protocol and must be able to track all outstanding transactions. Note that the BBU/CCU can be both an initiator of commands and a target of commands (for CSR read/write if nothing else). Address and control buffering happen in the IIF; bulk data buffering is preferably done in the BBU/CCU (in order to save space in the FCU, which has ten copies of the IIF). The IIF needs configuration for CPU and I/O modes, and to handle differences between multiple types of processors that may be used in different system configurations.

Memory Interface (MIF) 3108. The Memory Interface (MIF) is the portal to the memory system, acting as the interface between the rest of the chipset and the MCU(s). The MIF is the interpreter/filter/parser that receives transaction status from the TB and TC, issues requests to the MCU, receives replies from the MCU, and forwards the replies to the initiator of the transaction via the Data Switch. It is a "slave" device in that it can never be an initiator on the TB. (The MIF is an initiator in another sense, in that it sources data to the Data Switch.) For higher performance, the MIF supports speculative reads. Speculative reads start the read process early using the data from the TB rather than waiting for the data on the TSB. There is one MIF (regardless of how many memory interfaces there are). The MIF contains the memory mapping logic that determines the relationship between addresses and MCUs (and memory ports). The memory mapping logic includes means to configure the MIF for various memory banking/interleaving schemes. The MIF also contains the GART (Graphics Address Remap Table). Addresses that hit in the GART region of memory will be mapped by the GART to the proper physical address.

Configuration Register Interface (CFGIF) 410. This is where all the FCU's Control and Status Registers (CSRs) logically reside. CFGIF is responsible for the reading and writing of all the CSRs in the FCU, as well as all of the diagnostic reads/writes (e.g., diagnostic accesses to the duplicate tag RAM).

Channel Interface Block (CIB). The CIBs are the transmit and receive interface for the Channel connections to and from the FCU. The FCU has 14 copies of the CIB, 10 for BBUs/CCUs, and 4 for MCUs. (The CIB is generic, but the logic on the core-side of the Channel is an IIF or the MIF.)

Figure 3:
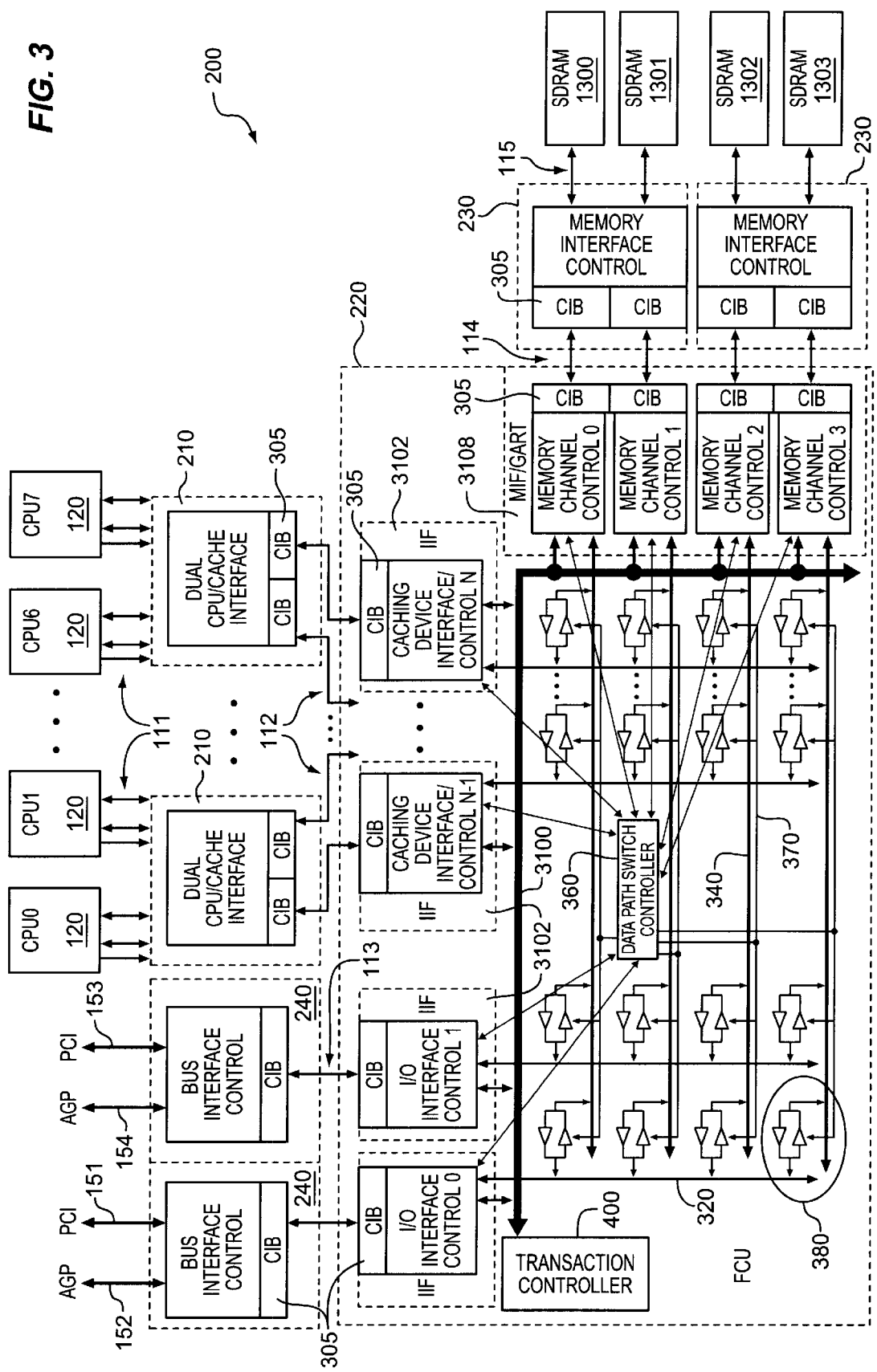
FIG. 3 is a drawing of the switched fabric data path architecture of FIG. 2, further showing internal detail of an FCU having a Transaction Controller (TC), Transaction Bus (TB), and Transaction Status Bus (TSB) according to the present invention.

Embodiments overview. FIG. 3 is a drawing showing internal detail of the switched fabric data path architecture within the FCU of FIG. 2. A first key component of the FCU is the Transaction Controller (TC) 400. A second key component of the FCU is an address and control bus 3100, that is actually an abstraction representing a Transaction Bus (TB) 3104 and Transaction Status Bus (TSB) 3106. A third key component of the FCU is the Data Path Switch (also referred herein as the Data Switch, or the switched fabric data path). The Data Switch is composed of vertical buses 320, horizontal buses 340, node switches 380. The node switches selectively couple the vertical and horizontal buses under control of the Data Path Switch Controller 360 and control signals 370. Additional key components of the FCU include one or more Initiator Interfaces (IIFs) 3102; a Memory Interface (MIF) 3108; and Channel Interface Blocks (CIBs) 305 at the periphery of the various interfaces.

Figure 4:
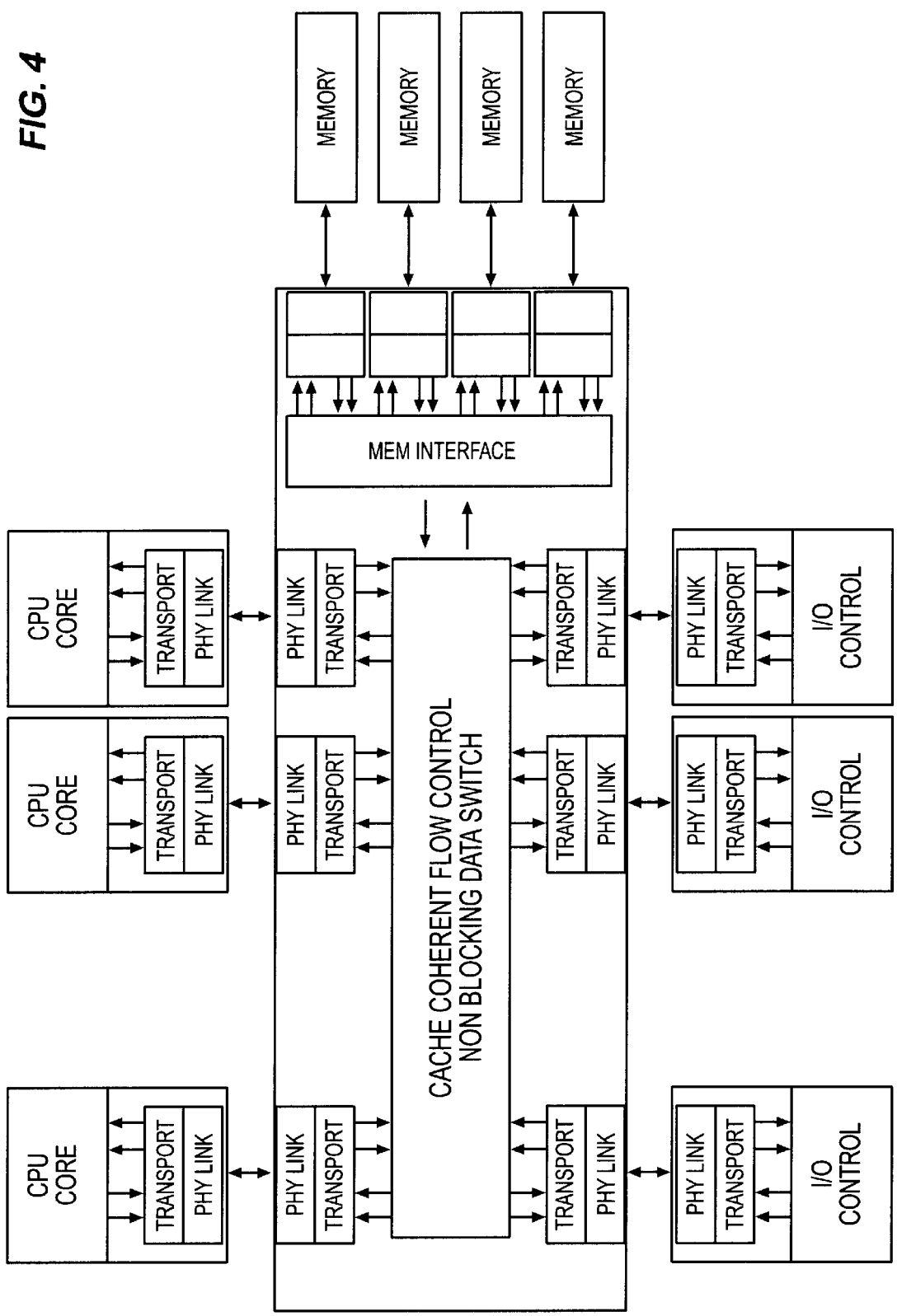
FIG. 4 is a drawing of a variation the embodiment of FIG. 2, it which each CPU has its own CCU, and in which the channel interface and control is abstractly represented as being composed of a physical (PHY) link layer and a transport layer.
Figure 6:
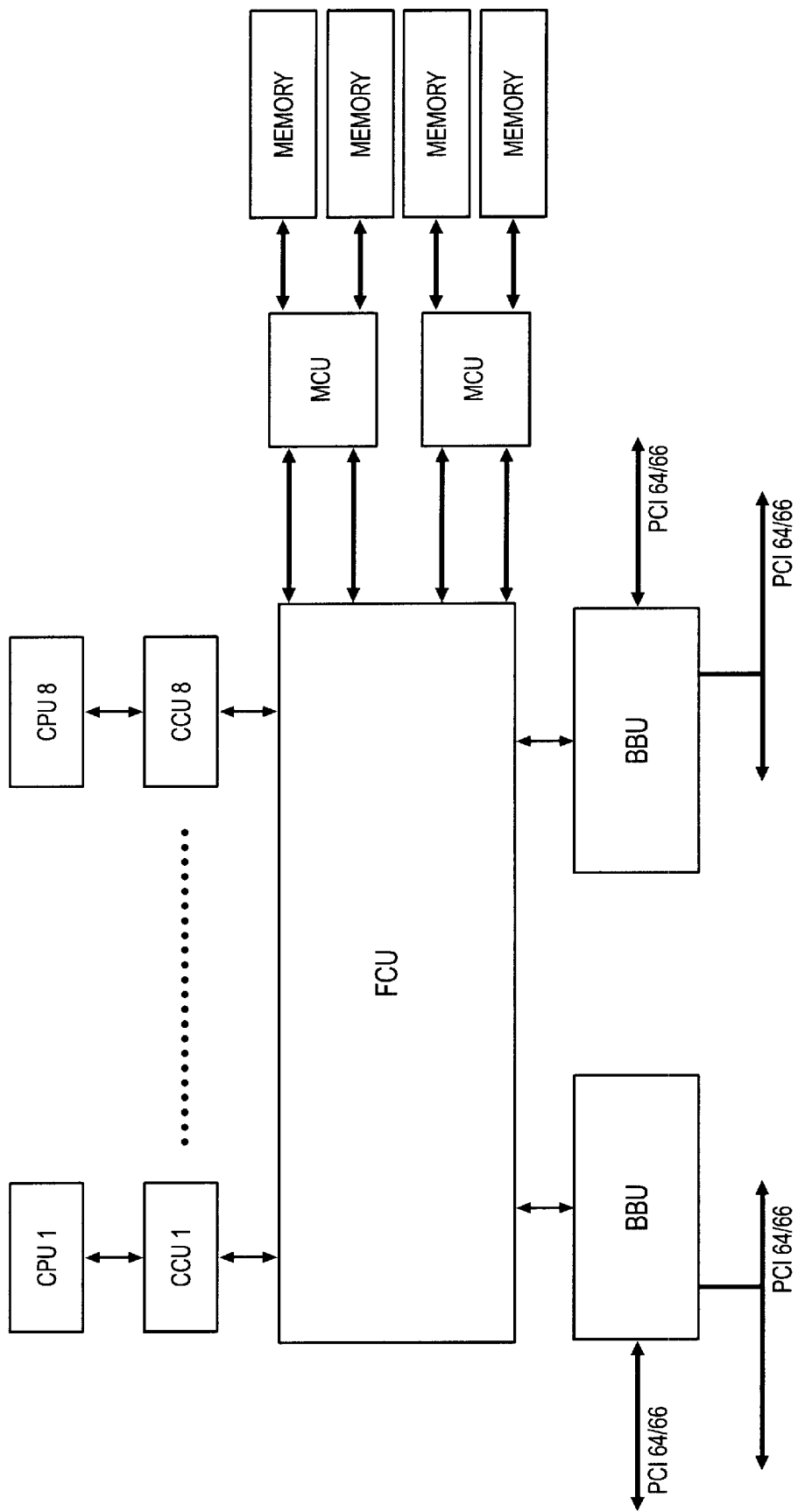
FIG. 6 is another view of the embodiment of FIG. 4.
Figure 7:
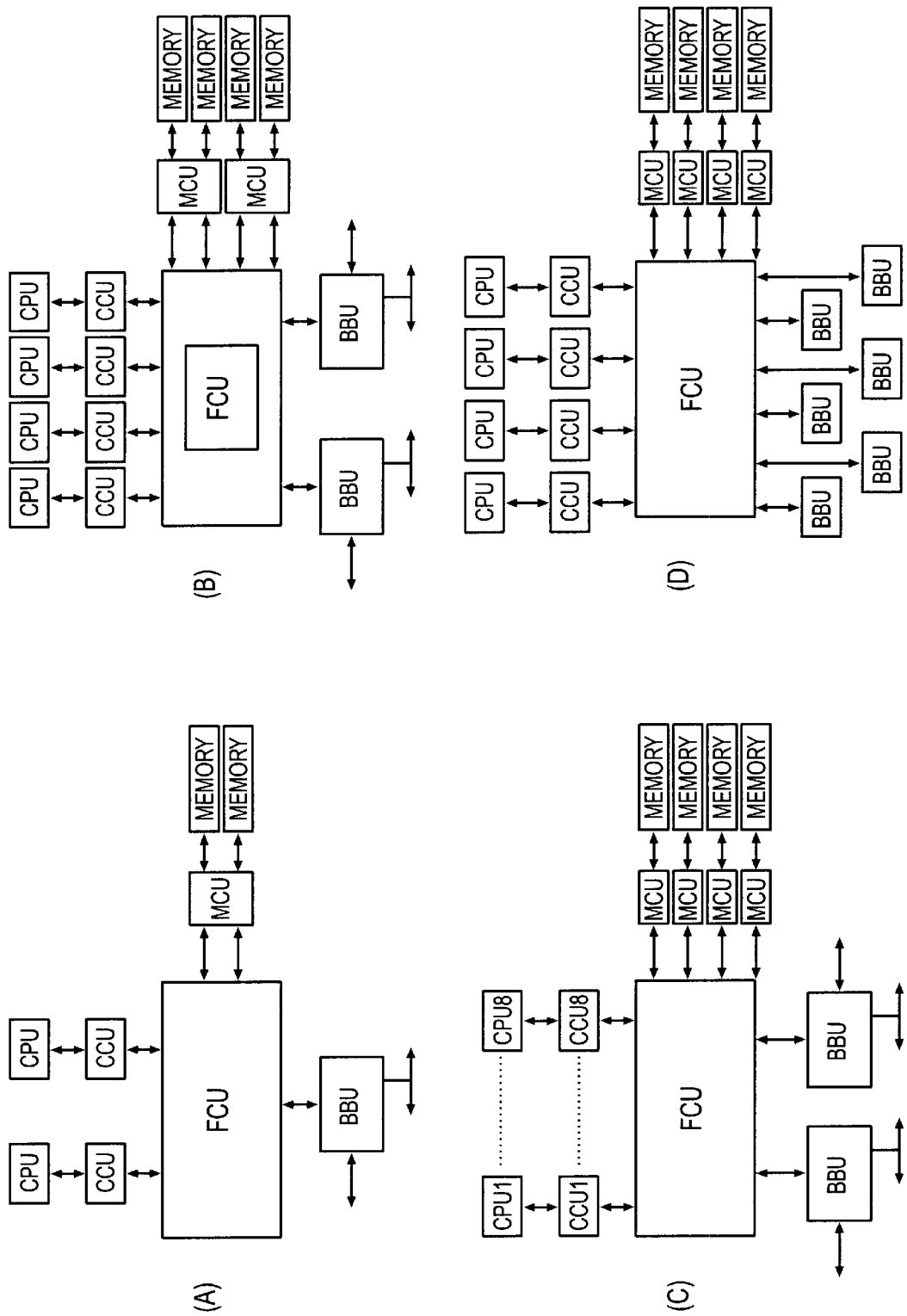
FIG. 7 is a drawing of a number of system embodiments according to the present invention.

A number of alternate embodiments exist. FIG. 4 is a drawing of a variation on the embodiment of FIG. 2, in which each CPU has its own CCU. In this view the channel interface and control that make up the IFs and CCUs are abstractly represented as being composed of a physical (PHY) link layer and a transport layer. FIG. 6 is another view of the embodiment of FIG. 4. FIG. 7 is a drawing of a number of application specific variations on the embodiment of FIG. 4. FIG. 7a illustrates a minimal configuration, 7b illustrates a 4-way configuration, 7c illustrates an 8-way high-performance configuration, and 7d illustrates a configuration for I/O intensive applications.

Figure 8:
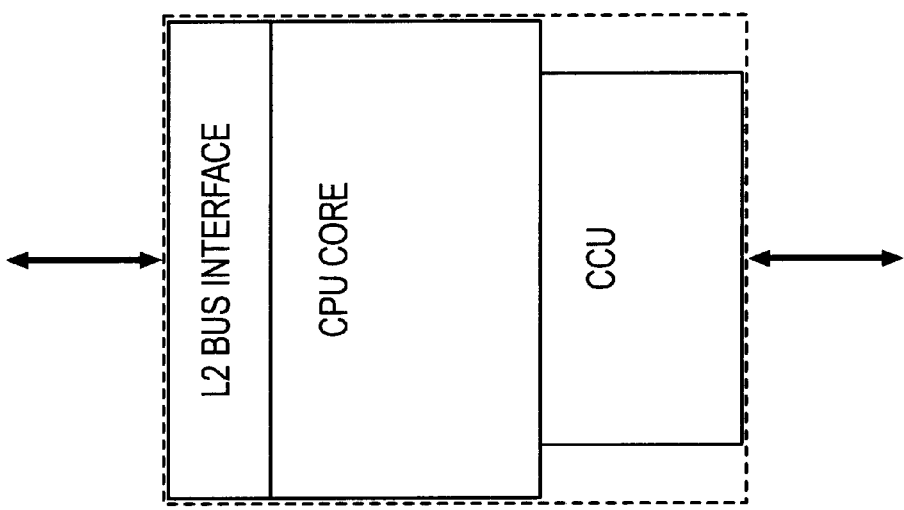
FIG. 8 is a drawing of a CPU having an integral CCU.

FIG. 8 is a drawing of a CPU having an integral CCU. FIG. 8 makes explicit a "backside" bus interface to an external cache (an L2 cache in the case illustrated). An IIF replaces the conventional CPU interface, such that the Channel is the frontside bus of the CPU of FIG. 8.

Figure 9:
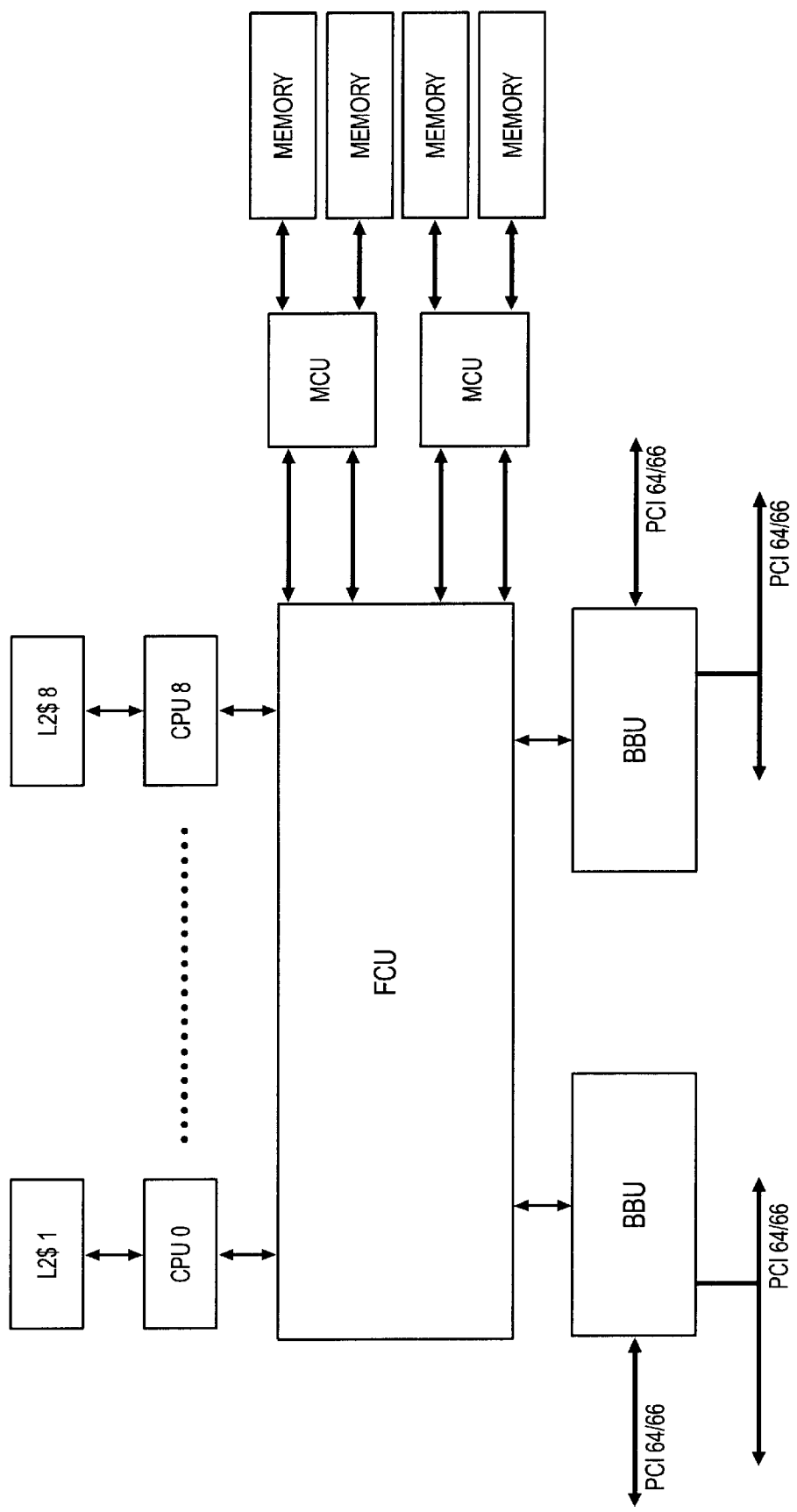
FIG. 9 illustrates a variation of the embodiment of FIG. 6 using the integrated CPU/CCU of FIG. 8.
Figure 10:
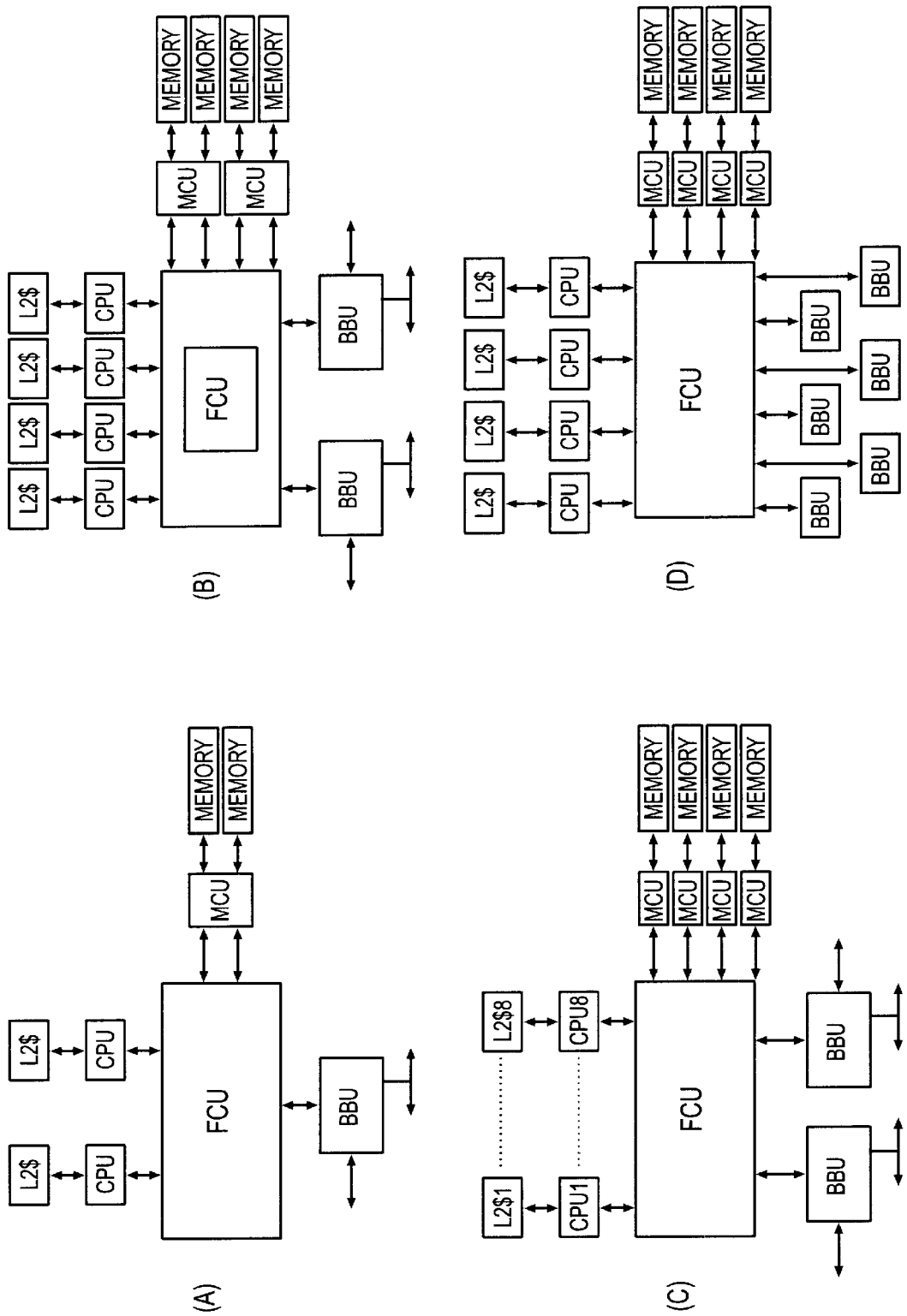
FIGS. 10a–d illustrates variations of the embodiments of FIG. 7 using the integrated CPU/CCU of FIG. 8.

The embodiments of FIGS. 9 and 10, are respective variations of the embodiments of FIGS. 6 and 7, with adaptation for the use of the integrated CPU/CCU of FIG. 8. The embodiments of FIGS. 9 and 10 offer system solutions with lower CPU pin counts, higher throughput, lower latency, hot plugable CPUs (if an OS supports it), and reduced PCB board layout complexity compared with non-integrated solutions.

Figure 11:
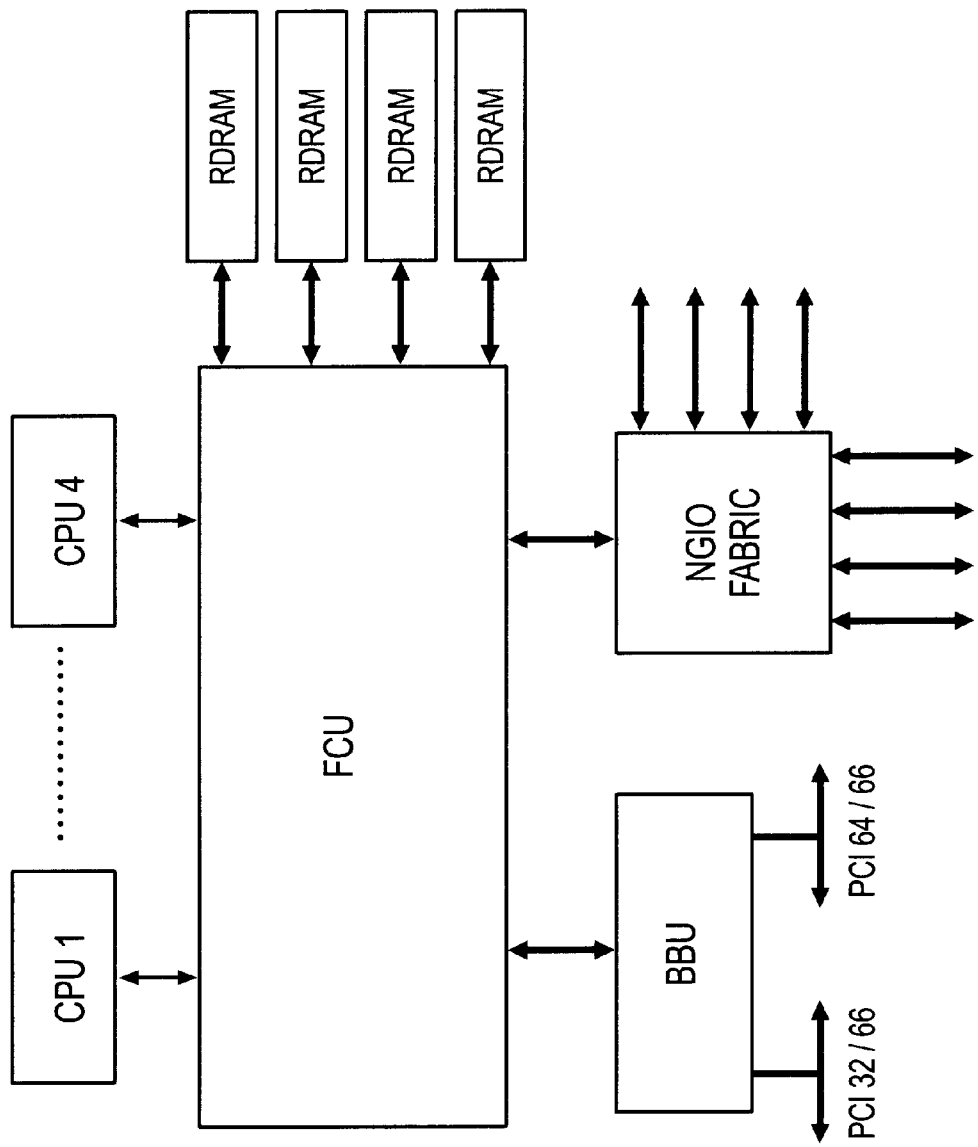
FIG. 11 is a drawing of an 4-way embodiment of the present invention that includes coupling to an industry standard switching fabric for coupling CPU/Memory complexes with I/O devices.

FIG. 11 is a drawing of an 4-way embodiment of the present invention that includes coupling to an industry standard switching fabric for coupling CPU/Memory complexes with I/O devices.

Figure 12:
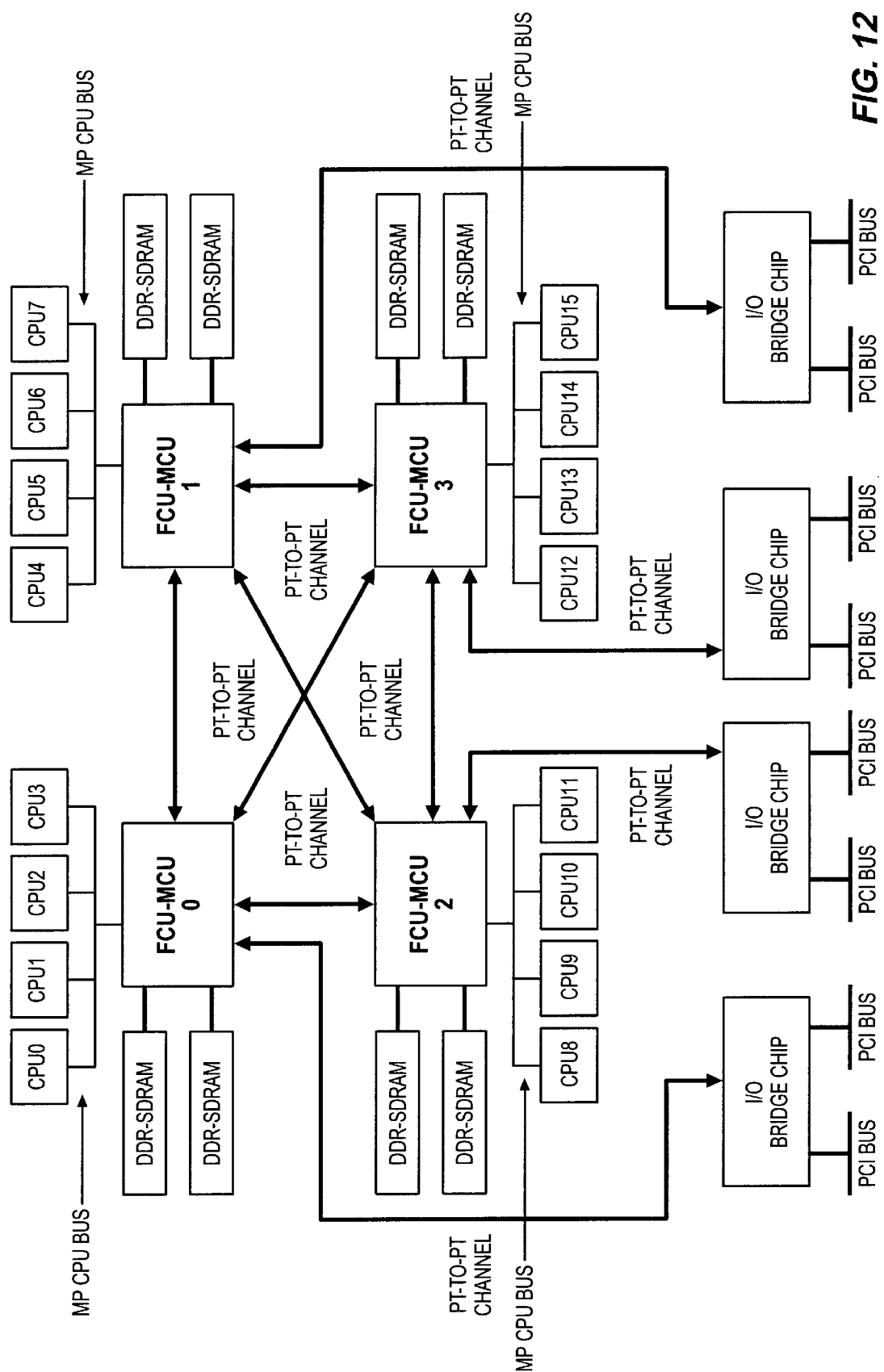
FIG. 12 is a drawing of an FCU-based architecture according to a first embodiment.

FIG. 12 is a drawing of an FCU-based architecture according to a first embodiment.

Figure 13:
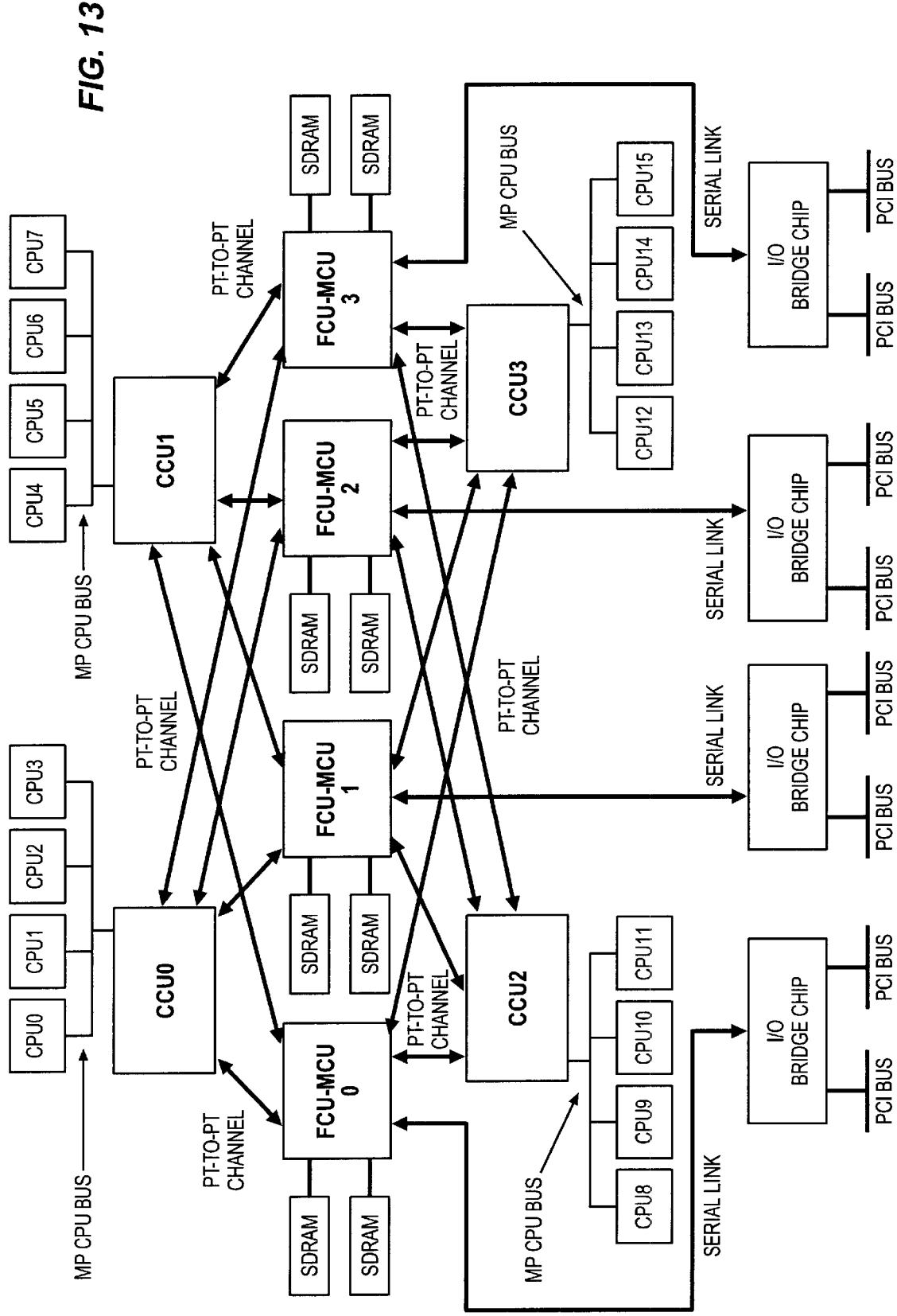
FIG. 13 is a drawing of an FCU-based architecture according to a second embodiment.

FIG. 13 is a drawing of an FCU-based architecture according to a second embodiment.

Figure 14:
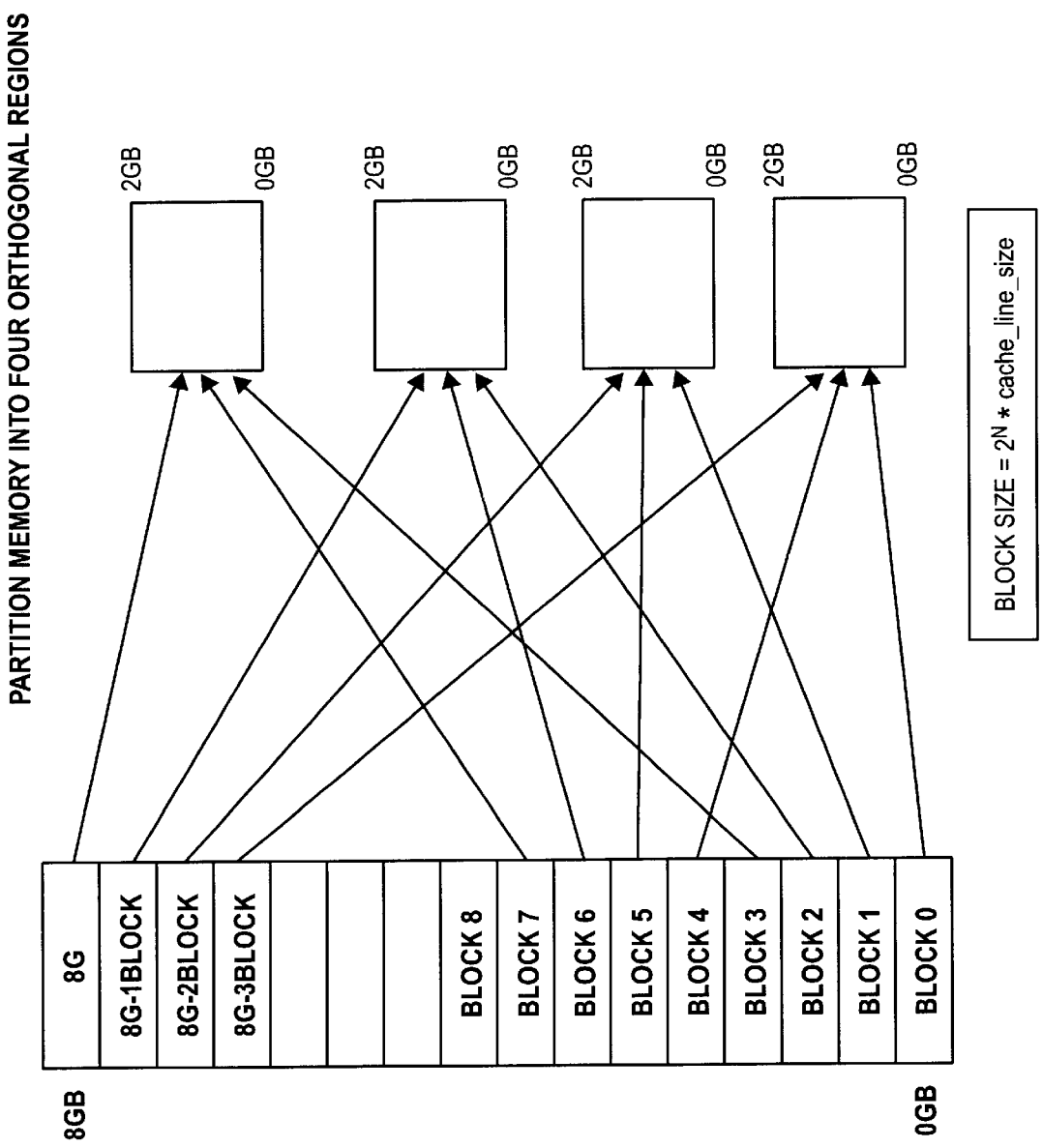
FIG. 14 defines the cache line characteristics of the systems of FIGS. 12 and 13.

FIG. 14 defines the cache line characteristics of the systems of FIGS. 12 and 13.

Additional Descriptions

U.S. application Ser. No. 08/986,430, AN APPARATUS AND METHOD FOR A CACHE COHERENT SHARED MEMORY MULTIPROCESSING SYSTEM, filed Dec. 7, 1997, incorporated by reference above, provides additional detail of the overall operation of the systems of FIGS. 2 and 3. U.S. application Ser. No. 09/163,294, METHOD AND APPARATUS FOR ADDRESS TRANSFERS, SYSTEM SERLIZATION, AND CENTRALIZED CACHE AND TRANSACTION CONTROL, IN, A SYMMETRIC MULTIPROCESSOR SYSTEM, filed Sep. 29, 1998, provides additional detail of particular transaction address bus embodiments, and was incorporated by reference previously herein. U.S. application Ser. No. 09/168,311, METHOD AN APPARATUS FOR EXTRACTING RECEIVED DIGITAL DATA FROM A FULLDUPLEX POINT-TO-POINT SIGNALING CHANNEL USING SAMPLED DATA TECHNIQUES, filed Oct. 7, 1998, provides additional detail of particular transceiver embodiments, and was incorporated by reference previously herein. U.S. application Ser. No. 09/281,749, CHANNEL INTERFACE AND PROTOCOLS FOR CACHE COHERENCY IN A SCALABLE SYMMETRIC MULTIPROCESSOR SYSTEM, filed Mar. 30, 1999, provides additional detail of the channel interface blocks and the transport protocol, and was incorporated by reference previously herein. To the extent to which any discrepancies exist between the description in the above referenced applications and the instant application, the instant application should take priority in resolving such discrepancies as it provides architectural improvements and preferred embodiments not known at the time of the filing of the earlier applications.

Fully Connected Multiple FCU Architectures

The invention describes:

Partition the memory system into $2, 4, 8 \ldots 2^n$ regions based on system cache line boundary or $2^n \times$(cache line size). see attached "memory-domain.doc"

Figure 15:
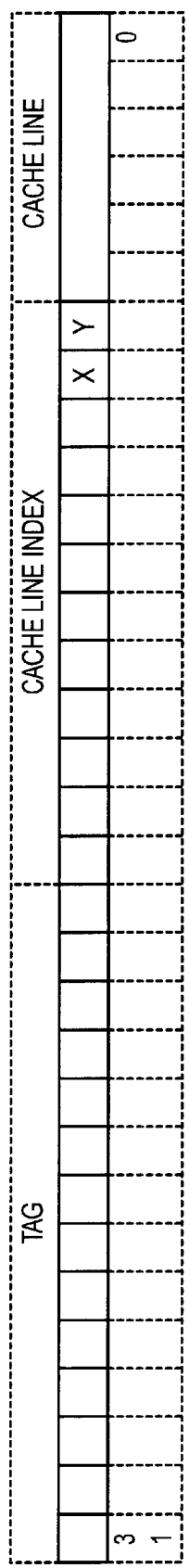
FIG. 15 defines the cache line definition.

See FIG. 15 re Cache line definition.

The transaction routing to any specific memory region is based on the equation below:

Memory Region 0 if XY=00

Memory Region 1 if XY=01

Memory Region 2 if XY=10

Memory Region 3 if XY=11

Memory region 0 is mapped to a integrated transaction routing and memory controller—FCU0, memory region 1 is mapped to FCU1 . . . memory region 3 is mapped to FCU3

The interconnection between FCUs are point to point and fully connected. Each FCU has direction connection to all other FCUs.

FCUs maintains the cache coherency for the transactions that belongs to its memory region, the transactions can come from the CPUs or I/O devices directly connected to the FCU or come from CPUs or I/O devices connected to other FCUs via the channel.

Transaction Example

CPU0 initiates a memory read transaction with address bit XY=00, the FCU0 checks the address and finds that the transaction belongs to its memory region, checks TAG array and if the cache state is Exclusive, Share or Invalidate then updates the TAG array, read the data from memory controller and supply the data to the CPU0 data bus.

CPU0 initiates a memory read transaction with address bit XY=01, the FCU0) checks the address and finds that the transaction belongs to the memory region at FCU1, the FCU0 forwards the transaction to FCU1. FCU1 checks TAG array and if the cache state is Exclusive, Share or Invalidate the channel. FCU0 receives the data and supply it to CPU0.

CPU0 initiates a memory read transaction with address bit XY=01, the FCU0 checks the address and finds that the transaction belongs to the memory region at FCU1, the FCU0 forwards the transaction to FCU1. FCU1 checks TAG array and if the cache state is Modified and that CPU is connected to the FCU1, it reads data from that CPU pointed by the TAG array then update the TAG array. FCU1 returns the data to FCU0 via the channel and FCU0 supplies the data to CPU0.

CPU0 initiates a memory read transaction with address bit XY=01, the FCU0 checks the address and finds that the transaction belongs to the memory region at FCU1, the FCU0 forwards the transaction to FCU1. FCU1 checks TAG array and if the cache state is Modified and that CPU is connected to the FCU3, the FCU1 will update its TAG and send read transaction to FCU2 with indication of Invalidation. FCU2 performs a Read Invalidate cycle to the CPU containing modified cache line and returns the data via channel between FCU2 and FCU0. FCU2 also sends a transaction completion cycle to FCU1 to indicate the transaction completion.

System Lock

Two methods have been developed for system level lock. That is at given period of time, only one initiator can perform transactions.

Method one: The initiator broadcasts lock transactions via channels to all FCUs. When all the FCUs return lock commit reply, the lock transaction proceeds. After the locked transaction completion, the initiator that issued the locked transaction will broadcast lock completion to all the FCUs.

Method two:

Use discrete wires:

FCU0_Lock_Req1 (to FCU1), FCU0_Lock_Req2 (to FCU2), FCU0_Lock_Req3 (to FCU3)

FCU1_Lock_Req0 (to FCU0), FCU1_Lock_Req2 (to FCU2), FCU1_Lock_Req3 (to FCU3)

FCU2_Lock_Req0 (to FCU0), FCU2_Lock_Req1 (to FCU1), FCU2_Lock_Req3 (to FCU3)

FCU3_Lock_Req0 (to FCU0), FCU3_Lock_Req1 (to FCU1), FCU3_Lock_Req2 (to FCU2)

FCU0_Lock_Gnt1 (from FCU1), FCU0_Lock_Gnt2 (from FCU2), FCU0_Lock_Gnt3 (From FCU3)

FCU1_Lock_Gnt0 (from FCU0), FCU1_Lock_Gnt2 (from FCU2), FCU1_Lock_Gnt3 (from FCU3)

FCU2_Lock_Gnt0 (from FCU0), FCU2_Lock_Gnt1 (from FCU1), FCU2_Lock_Gnt3 (from FCU3)

FCU3_Lock_Gnt0 (from FCU0), FCU3_Lock_Gnt1 (from FCU1), FCU3_Lock_Gnt2 (from FCU2)

The invention includes a method of reading data from cacheable memory space in a symmetric multiprocessor system. The method comprises:

partitioning the M memory of the system into a plurality of orthogonal address regions;

providing a plurality of single chip flow control units, each flow control unit having an integral switch fabric for routing transactions between a plurality of communications ports, each flow control unit having an attached plurality of CPUs, each flow control wit having attached memory devices for one of the plurality of address regions, each flow control unit having an integral transaction serialization point for accesses to the attached memory devices;

fully connecting the plurality of flow control units;

for a first read executed in a CPU attached to a first of the flow control units, if the read corresponds to a first memory location within the attached memory devices of the first flow control unit, and if the first memory location has an associated cache state that is not a modified state, executing the first read without performing a channel crossing, for a second read executed in a CPU attached to a first of the flow control units, if the read corresponds to a second memory location within the attached memory devices of other than the first flow control unit, and if the second memory location has an associated cache state that is not the modified state, executing the second read using at most two channel crossings; and for a third read executed in a CPU attached to a first of the flow control units, if the read corresponds to a third memory location within the attached memory devices of other than the first flow control unit, and if the third memory location has an associated cache state that is the modified state, executing the third read using at most three channel crossings.

CONCLUSION

While various embodiments of the present invention have been described above, it should be understood that they have been presented by way of example only, and not limitation. It will be understood by those skilled in the art that various changes in form and details may be made herein without departing from the spirit and scope of the invention as defined in the appended claims. Thus, the breadth and scope of the present invention should not be limited by any of the above-described exemplary embodiments, but should be defined only in accordance with the following claims and their equivalents.

We claim:

1. A multi-processor shared memory system comprising:
   a first set of point-to-point connections;
   a first set of processors each coupled to one of the first set of point-to-point connections;
   a first memory coupled to one of the first set of point-to-point connections;
   a first flow control unit including a first data switch coupled to the first set of point-to-point connections wherein the first data switch is configured to interconnect the first set of point-to-point connections to provide first data paths between the first memory and the first set of processors;
   a second set of point-to-point connections;
   a second set of processors each coupled to one of the second set of point-to-point connections;
   a second memory coupled to one of the second set of point-to-point connections;
   a second flow control unit including a second data switch coupled to the second set of point-to-point connections wherein the second data switch is configured to interconnect the second set of point-to-point connections to provide second data paths between the second memory and the second set of processors; and
   a third point-to-point connection coupled to the first data switch and to the second data switch wherein the first data switch is configured to interconnect the first set of point-to-point connections to the third point-to-point connection and the second data switch is configured to interconnect the second set of point-to-point connections to the third point-to-point connection to provide third data paths between the second memory and the first set of processors and between the first memory and the second set of processors.

2. The system of claim 1 wherein
   the first set of processors include first caches;
   the second set of processors include second caches;
   the first flow control unit is configured to maintain cache coherency between the first memory, the first caches, and the second caches; and
   the second flow control unit is configured to maintain cache coherency between the second memory, the first caches, and the second caches.

3. The system of claim 2 wherein:
   the first flow control unit is configured to maintain first duplicate tags for the first caches; and
   the second flow control unit is configured to maintain second duplicate tags for the second caches.

4. The system of claim 1 wherein
   the first flow control unit is configured to provide a first system serialization point for the first memory; and
   the second flow control unit is configured to provide a second system serialization point for the second memory.

5. The system of claim 1 wherein the first set of processors and the second set of processors transfer packets that indicate one of the first memory and the second memory.

6. A method of operating a multi-processor shared memory system comprising a first set of point-to-point connections, a first set of processors each coupled to one of the first set of point-to-point connections, a first memory coupled to one of the first set of point-to-point connections, a first flow control unit including a first data switch coupled to the first set of point-to-point connections, a second set of point-to-point connections, a second set of processors each coupled to one of the second set of point-to-point connections, a second memory coupled to one of the second set of point-to-point connections, a second flow control unit including a second data switch coupled to the second set of point-to-point connections, and a third point-to-point connection coupled to the first data switch and to the second data switch, the method comprising:
   interconnecting the first set of point-to-point connections in the first data switch to provide first data paths between the first memory and the first set of processors;
   interconnecting the second set of point-to-point connections in the second data switch to provide second data paths between the second memory and the second set of processors; and
   interconnecting the first set of point-to-point connections to the third point-to-point connection in the first data switch and interconnecting the second set of point-to-point connections to the third point-to-point connection in the second data switch to provide third data paths between the second memory and the first set of processors and between the first memory and the second set of processors.

7. The method of claim 6 wherein the first set of processors include first caches and the second set of processors include second caches, further comprising;
   in the first flow control unit, maintaining cache coherency between the first memory, the first caches, and the second caches; and
   in the second flow control unit, maintaining cache coherency between the second memory, the first caches, and the second caches.

8. The method of claim 7 wherein maintaining the cache coherency comprises:
   in the first flow control unit, maintaining first duplicate tags for the first caches; and
   in the second flow control unit, maintaining second duplicate tags for the second caches.

9. The method of claim 6 further comprising:
   in the first flow control unit, providing a first system serialization point for the first memory; and
   in the second flow control unit, providing a second system serialization point for the second memory.

10. The method of claim 6 further comprising transferring packets that indicate one of the first memory and the second memory from the first set of processors and the second set of processors.

* * * * *

UNITED STATES PATENT AND TRADEMARK OFFICE
CERTIFICATE OF CORRECTION

PATENT NO. : 6,633,945 B1  Page 1 of 1
DATED : October 14, 2003
INVENTOR(S) : Fu et al.

It is certified that error appears in the above-identified patent and that said Letters Patent is hereby corrected as shown below:

<u>Title page,</u>
Item [63], should read

-- Related U.S. Application Data
[63]    Continuation-in-part of application No. 08/986,430, filed on Dec. 7, 1997, now Pat. No. 6,065,077, and a continuation-in-part of application No. 09/163,294, filed on Sep. 29, 1998, now Pat. No. 6,292,705, and a continuation-in-part of application No. 09/281,749, filed on Mar. 30, 1999, now Pat. No. 6,516,442 --.

Signed and Sealed this

Sixth Day of January, 2004

JAMES E. ROGAN
*Director of the United States Patent and Trademark Office*